(12) United States Patent
Halimi et al.

(10) Patent No.: US 10,591,080 B2
(45) Date of Patent: Mar. 17, 2020

(54) RETROFIT MOTORIZED ACTUATOR FOR REMOTE FLUID CONTROL

(71) Applicant: Flo Technologies, Inc., Los Angeles, CA (US)

(72) Inventors: Henry M. Halimi, Los Angeles, CA (US); Jeffrey Scilingo, Londonderry, NH (US)

(73) Assignee: FLO TECHNOLOGIES, INC., Los Angeles, CA (US)

( * ) Notice: Subject to any disclaimer, the term of this patent is extended or adjusted under 35 U.S.C. 154(b) by 156 days.

(21) Appl. No.: 15/165,196

(22) Filed: May 26, 2016

(65) Prior Publication Data

US 2016/0348802 A1    Dec. 1, 2016

Related U.S. Application Data

(60) Provisional application No. 62/166,827, filed on May 27, 2015.

(51) Int. Cl.
*F16K 31/05* (2006.01)
*F16K 31/04* (2006.01)
*F16K 5/06* (2006.01)

(52) U.S. Cl.
CPC .......... *F16K 31/055* (2013.01); *F16K 5/0647* (2013.01); *F16K 5/0652* (2013.01); *F16K 31/042* (2013.01); *F16K 31/043* (2013.01); *Y10T 137/0491* (2015.04); *Y10T 137/7065* (2015.04)

(58) Field of Classification Search
CPC ...... F16K 31/05; F16K 31/055; F16K 31/041; F16K 5/0652; F16K 31/043; F16K 31/042; F16K 5/0647; Y10T 137/7065; Y10T 137/0491
See application file for complete search history.

(56) References Cited

U.S. PATENT DOCUMENTS

| 2,930,136 | A | * | 3/1960 | Knudsen | G01B 5/0032 33/606 |
|---|---|---|---|---|---|
| 3,085,781 | A | * | 4/1963 | La Pointe | F16K 31/043 251/67 |
| 3,651,544 | A | * | 3/1972 | Soma | F16L 3/233 24/16 R |
| 4,313,595 | A | | 2/1982 | Markley et al. | |

(Continued)

*Primary Examiner* — Atif H Chaudry
(74) *Attorney, Agent, or Firm* — Hackler Daghighian Martino & Novak (57) ABSTRACT

A retrofit motorized actuator assembly is attachable to a portion of a fluid pipe having a manually actuated valve connected in series. The valve includes a cantilevered valve handle manually rotatable about a valve axis. The retrofit motorized actuator assembly includes a motorized actuator including a drive shaft extension rotatably controllable by the motorized actuator about a drive shaft axis. A mounting assembly is configured to fixedly attach to the portion of the fluid pipe and also fixedly position the motorized actuator wherein the drive shaft axis of the motorized actuator is aligned with the valve axis. A quick connect clamp is configured to fixedly attach together both the drive shaft extension and the cantilevered valve handle. The quick connect clamp is configured to be attachable and removable with just the use of a user's hands without the need for auxiliary tools.

17 Claims, 9 Drawing Sheets

(56) References Cited

U.S. PATENT DOCUMENTS

| | | |
|---|---|---|
| 4,488,567 A | 12/1984 | Grant |
| 4,637,423 A | 1/1987 | Gray |
| 4,719,939 A | 1/1988 | Killian |
| 5,158,483 A | 10/1992 | Fishman et al. |
| 6,206,337 B1 | 3/2001 | Veillet, Jr. |
| 6,662,821 B2 | 12/2003 | Jacobsen et al. |
| 6,701,951 B1 | 3/2004 | Drinkwater |
| 7,066,192 B1 | 6/2006 | Delaney et al. |
| 9,016,662 B2 | 4/2015 | Staffiere et al. |
| 2006/0202051 A1 | 9/2006 | Parsons et al. |
| 2007/0289635 A1 | 12/2007 | Ghazarian et al. |
| 2008/0300803 A1 | 12/2008 | Drake et al. |
| 2011/0114202 A1 | 5/2011 | Goseco |
| 2011/0178644 A1 | 7/2011 | Picton |
| 2013/0218174 A1* | 8/2013 | Bjerken .............. A61B 17/0469 606/144 |
| 2014/0230925 A1 | 8/2014 | Halimi |
| 2014/0264111 A1* | 9/2014 | Porter .................... F16K 17/36 251/129.03 |

\* cited by examiner

RETROFIT MOTORIZED ACTUATOR FOR REMOTE FLUID CONTROL

CROSS-REFERENCE TO RELATED APPLICATIONS

This non-provisional application claims priority to provisional application 62/166,827 filed on May 27, 2016, the entire contents of which are fully incorporated herein with this reference.

DESCRIPTION

Field of the Invention

The present invention generally relates to fluid valves. More particularly, the present invention relates to a retrofit motorized actuator assembly that can remotely turn on or off the fluid valve but can also be manually actuated in case of emergency.

BACKGROUND OF THE INVENTION

With emergence of new water safety and conservation technologies, there is a tremendous demand for remote operation of water valves in residential and commercial buildings. Replacing the existing valves with a readily available motorized actuator valve is costly and requires services of a professional plumber.

Presently, there is no product available in the "do it yourself" (DIY) market to retrofit an in-service ¼ turn lever handled water valve with a motorized actuator. Existing products require shutting off the water or making modifications to the valve that would require the services of a professional plumber or the like.

Figure 1:
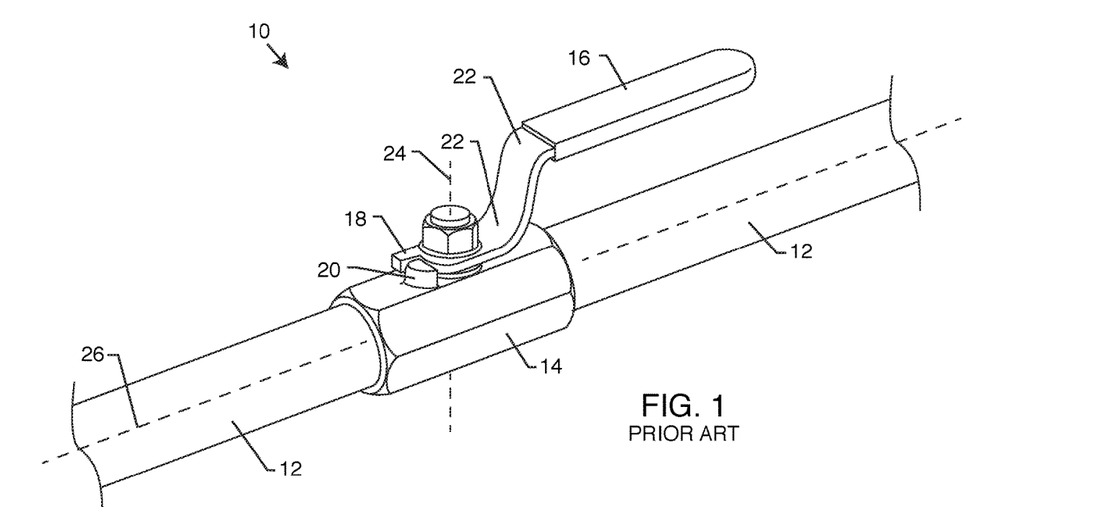
FIG. 1 is a perspective view of a prior art fluid valve having a valve body assembly and a manually rotatable handle.

The far majority of in-service water valves in North America are "one quarter (¼) turn ball valves with lever handles" (see FIG. 1). The size of these valves vary between ½" to ¼".

This invention enables the DIY homeowner with help of basic tools (screw driver, plyers, etc.) to retrofit an "in service" ¼ turn lever handled ball valve with a motorized actuator without disturbing the flow of water or otherwise modifying the valve.

Additionally, this invention allows manual operation of the valve without dismantling (or dismounting) the attachments to the installation The retrofit kit is designed to be used with most manufacturer's products in a pre-defined pipe size range.

SUMMARY OF THE INVENTION

An exemplary embodiment of a retrofit motorized actuator assembly comprises a plurality of separate components attachable to a portion of a fluid pipe extending along a longitudinal direction having a manually actuated valve connected in series along the portion of the fluid pipe. The valve includes a cantilevered valve handle manually rotatable about a valve axis that is perpendicular to the longitudinal direction for opening and closing the valve. The retrofit motorized actuator assembly comprises a first and second pipe clamp each configured to fixedly attach to the portion of the fluid pipe on either side of the valve. A first and second adjustable bracket are configured to fixedly attach to their respective first and second pipe clamps, each adjustable bracket translatably adjustable in relation to the pipe clamp in a direction perpendicular to the longitudinal direction. A mounting plate includes a set of bracket mounting apertures disposed at both ends of the mounting plate, the set of bracket mounting apertures configured to attach to their respective adjustable brackets with fasteners. The mounting plate also includes a set of actuator mounting apertures disposed between the bracket mounting apertures. A motorized actuator is configured to fixedly attach to the set of actuator mounting apertures with additional fasteners. The motorized actuator includes a drive shaft extension rotatably controllable by the motorized actuator. The drive shaft extension is configured to extend through a portion of the set of actuator mounting apertures and extend beyond the mounting plate. A drive lever is connectable to the drive shaft extension, where the drive lever is configured to be adjacently disposed in parallel to the cantilevered valve handle. A quick connect clamp is configured to fixedly attach together both the drive lever and the cantilevered valve handle, wherein the quick connect clamp is configured to be attachable and removable with just the use of a user's hands.

In other embodiments the quick connect clamp may be configured to be attachable and removable without the use of external tools or devices. The quick connect clamp may be a separate part from the drive lever or the quick connect clamp is part of the drive lever.

In other embodiments the quick connect clamp may be a ring configured to slide over and couple together the drive lever and the cantilevered valve handle.

In other embodiments the quick connect clamp may be a U-shaped structure with a hand-releasable locking fastener.

In other embodiments the quick connect clamp may be a two-part assembly held together with at least one hand-releasable locking fastener.

In other embodiments the first and second pipe clamp each may comprise two parts held together with at least one fastener.

In other embodiments the set of actuator mounting apertures may include a centered slot elongated along the longitudinal direction.

In other embodiments the set of actuator mounting apertures may include a plurality of thru holes disposed along the longitudinal direction.

In other embodiments the drive lever may include a drive shaft key aperture configured to match the shape of the drive shaft extension.

In other embodiments the motorized actuator may include at least one set of wires connectable to controlling electronics and/or devices.

In other embodiments the motorized actuator may include a wireless communication system connectable to controlling electronics and/or devices.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

FIG. 1 shows a prior art fluid valve assembly 10 connected in series within a portion of a fluid pipe 12 that extends along a longitudinal direction 26. The fluid valve assembly 10 includes a valve portion 14 connected to a valve handle 16. In many cases the valve portion 14 is of a ball valve, but could be any valve design or type known to those skilled in the art that control the flow of a fluid within. A fluid can include any liquid, gas or combination thereof. The valve handle 16 may include an extension 18 that is configured to contact a stop 20. In this way the rotation of the valve handle 16 is prevented from over-rotating in one direction. The valve handle 16 is generally described as being cantilevered from the valve axis of rotation 24. The valve handle 16 usually includes a couple bends 22 such that the cantilevered portion of the valve handle 16 is raised a distance above the valve portion 14 such that a user's hand can easily grasp and rotate the valve handle 16 about the axis of rotation 24. It is typical that 90 degrees of rotation (¼ turn) of the valve handle 16 can either stop the fluid flow through the fluid pipe 12 or allow fluid to flow through the fluid pipe 12.

Figure 2:
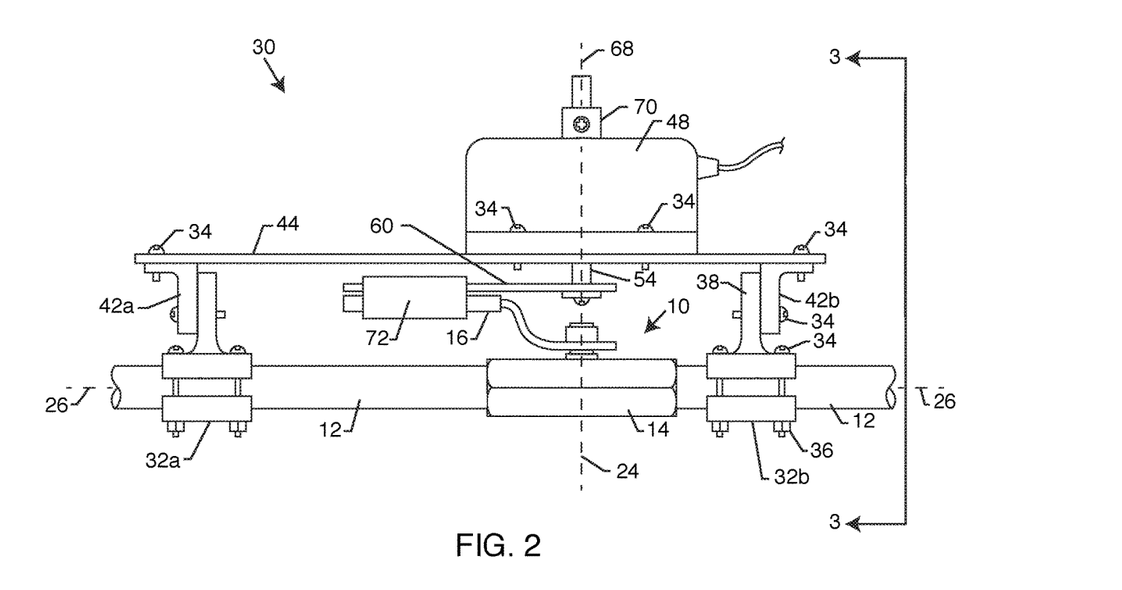
FIG. 2 is a side view of an exemplary embodiment of the invention where the retrofit motorized actuator assembly is attached to a prior art fluid valve such as that from FIG. 1.
Figure 3:
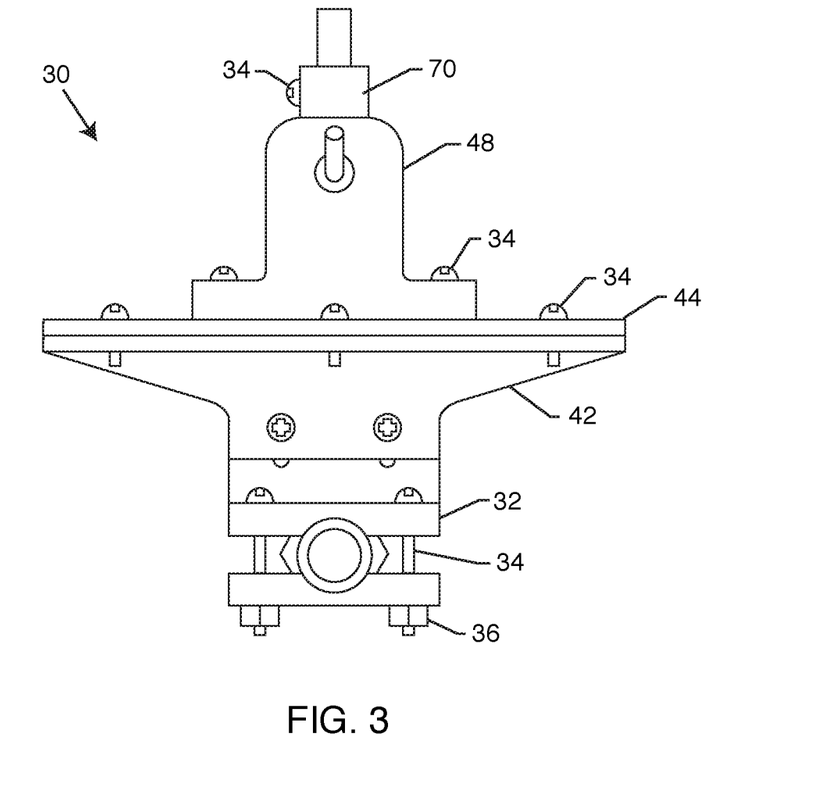
FIG. 3 is a side view of the structure of FIG. 2 taken along lines 3-3 from FIG. 2.
Figure 3A:
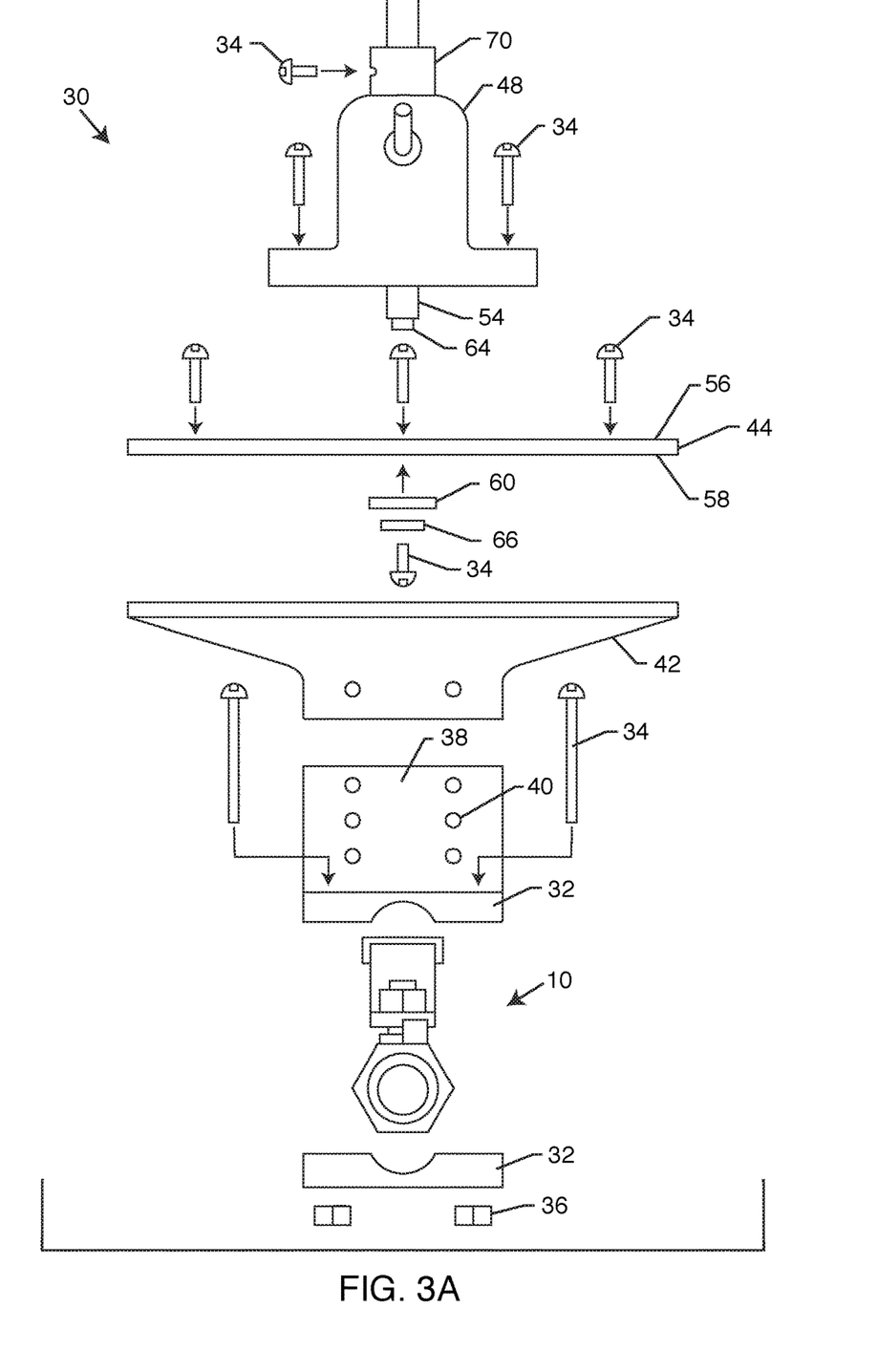
FIG. 3A is an exploded view of the structure of FIG. 3.

FIGS. 2 and 3 show a retrofit motorized actuator assembly 30 which comprises a plurality of separate components attachable to the portion of a fluid pipe 12 extending along the longitudinal direction 26. FIG. 3A is an exploded view similar to FIG. 3 to help show the various components of the retrofit motorized actuator assembly 30. As shown and described in FIG. 1, the manually actuated valve 14 is connected in series along the portion of the fluid pipe 12. The valve 14 includes a cantilevered valve handle 16 manually rotatable about the valve axis 24 that is perpendicular to the longitudinal direction 26 for opening and closing the valve 14.

The retrofit motorized actuator assembly 30 includes a first pipe clamp 32a and second pipe clamp 32b each configured to fixedly attach to the portion of the fluid pipe 12 on either side of the valve 14. The clamps 32 are designed and configured to grasp the tubular shape of the fluid pipe 12. It will be understood by those skilled in the art that many types and designs of clamps 32 could be utilized to fixedly attach to the fluid pipe 12. As shown herein, the clamps 32 are of a two part design where a multitude of fasteners 34 and nuts 36 exert a force on the clamp to fixedly attach it to the fluid pipe 12. It is also understood that the nut 36 could be removed and the fastener thread directly into the opposite side of the clamp 32 to create a preload, which is applicable to all the fasteners or fastening methods described later herein. The clamps 32 also include a riser portion 38 with a plurality of apertures 40 at varying heights which is best seen in FIG. 3A.

Attachable to the pipe clamps 32a and 32b respectively are a first adjustable bracket 42a and a second adjustable bracket 42b. Again, fasteners 34 may be used to fixedly attach the pipe clamps 32 to the adjustable brackets 42. The adjustable brackets 42 can be fixedly attached to the clamps 32 at varying heights due to the plurality of apertures 40. It is understood by those skilled in the art that there are a large variety of designs and configurations that would allow one to fixedly adjust the height between the clamps 32 and adjustable brackets 42 as this application is not limited to the specific embodiment shown and taught herein. In general, the first and second adjustable brackets 42 are configured to fixedly attach to their respective first and second pipe clamps 32, where each adjustable bracket 42 is translatably adjustable in relation to the pipe clamp 32 in a direction perpendicular to the longitudinal direction 26.

Figure 6:
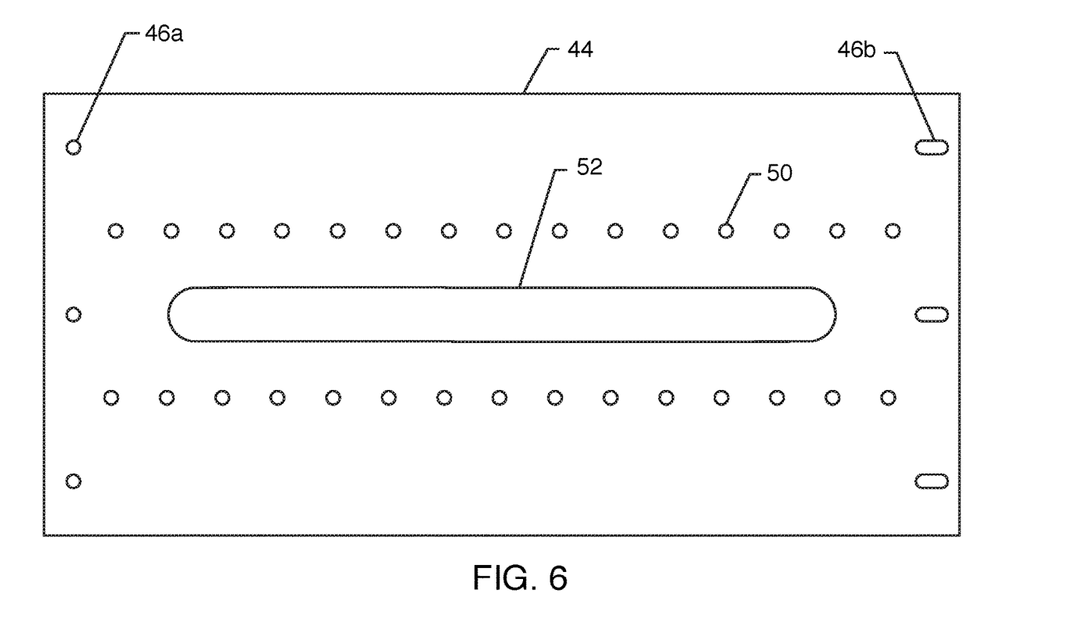
FIG. 6 is a top view of the structure of an exemplary mounting plate taken from the structure of FIGS. 2 and 3.

The adjustable brackets 42 are then attached to a mounting plate 44. The mounting plate is best seen in FIG. 6 in a top view. The mounting plate 44 includes a set of bracket mounting apertures 46 disposed at both ends of the mounting plate that are configured to attach to the adjustable brackets. In this particular embodiment the bracket mounting apertures 46*a* are through holes whereas the bracket mounting apertures 46*b* are slotted. The slots 46*b* allow for tolerance when attaching the mounting plate 44 to the adjustable brackets 42. The slots 46*b* could have also been through holes similar to 46*a*. In summary, the set of bracket mounting apertures 46 are configured to attach to their respective adjustable brackets 42 with fasteners 34 or the like.

A motorized actuator 48 is configured to attach to the mounting plate 44. Therefore, the mounting plate also includes a set of actuator mounting apertures 50 disposed between the bracket mounting apertures 46. The mounting plate 44 also includes a drive slot 52 which accommodates a drive shaft extension of the motorized actuator to penetrate there through. The set of actuator mounting apertures 50 and drive slot 52 allow the motorized actuator to be placed at a variety of locations along the longitudinal direction 26 as this is an aid in facilitating easy installation by the user.

The motorized actuator 48 is configured to fixedly attach to the mounting plate top 56 by the set of actuator mounting apertures 46 with additional fasteners 34. The motorized actuator 48 includes a drive shaft extension 54 rotatably controllable by the motorized actuator 48. The drive shaft extension 54 is configured to extend through a portion of the set of actuator mounting apertures (i.e. the drive slot 52) and extend beyond mounting plate bottom 58 as best seen in FIG. 2.

Figures 4, 5:
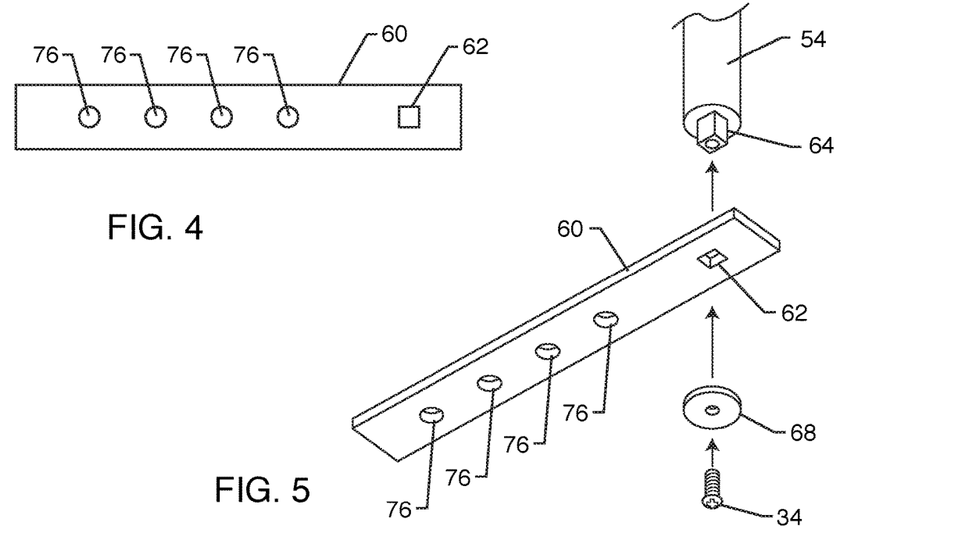
FIG. 4 is a top view of the structure of an exemplary drive lever taken from the structure of FIGS. 2 and 3.
FIG. 5 is an exploded perspective view of how the drive lever of FIG. 4 attaches to the drive shaft extension of the motorized actuator.

A drive lever 60 is connectable to the drive shaft extension 54. For example, the drive lever 60 can include a non-rotatable key aperture 62. In FIG. 4 the key aperture 62 is shown as a rectangular hole. The drive shaft extension 54 would then include a similarly shaped insertable key 64. Here, the insertable key 64 would also be rectangularly shaped to fit non-rotatably within the key aperture 62. In this way the drive shaft extension is fixedly connectable to the drive lever 60. This may be best seen in FIG. 5 which also shows a washer 68 and a fastener 34 that help hold the drive lever 60 to the drive shaft extension 54. It will be understood by those skilled in the art that a variety of methods and designs could be utilized to connect the drive lever 60 to the drive shaft extension 54 as this teaching is not limited just the exact structure shown and taught herein. Furthermore, the drive shaft extension 54 may also be an optional feature and may be eliminated or integrated as one structure combined with the drive lever 60.

All of the various adjustability of the components to the retrofit motorized actuator assembly 30 is designed and configured such that the user is able to attach the retrofit motorized actuator assembly such that the drive lever 60 is disposed directly above and adjacent to the valve handle 16 with the axis of rotation of the valve handle 24 aligning with the axis of rotation 68 of the drive shaft extension 54. In other words, the drive lever 60 is configured to be adjacently disposed in parallel to the cantilevered valve handle 16.

Figure 7A:
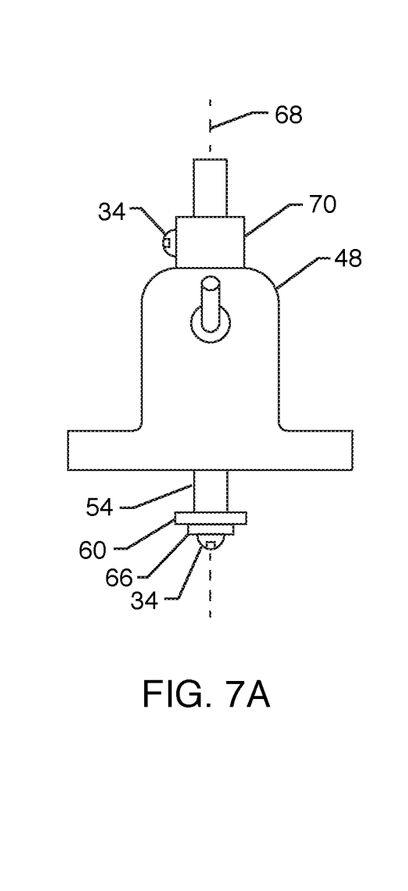
FIG. 7A is a side view of the structure of the motorized actuator similar to FIG. 3 showing the drive shaft extension raised.
Figure 7B:
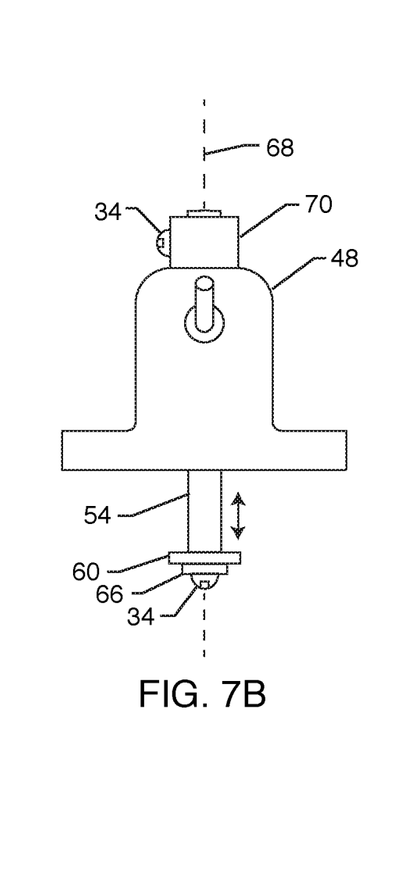
FIG. 7B is a side view of the structure of the motorized actuator similar to FIG. 3 now showing the drive shaft extension lowered.

As shown in FIGS. 7A and 7B, to further aid in placement of the drive lever 60, the drive shaft extension 54 can be raised or lowered with the use of a collar 70 and a fastener 34 or the like. The motorized actuator 48 rotates the collar 70. Then the drive shaft extension 54 is able to move up and down within the collar 70. The fastener 34 is then used to lock the collar 70 and drive shaft extension 54 together such that they rotate as one unit. FIG. 7A shows the drive shaft extension 54 raised while FIG. 7B shows the drive shaft extension 54 lowered. It will be understood by those skilled in the art that many methods or structures could be used to allow the drive shaft extension 54 to be raised or lowered as this disclosure is not to be limited just to the exact embodiment shown and taught herein.

Referring back to FIG. 2 a quick connect clamp 72 is configured to fixedly attach together both the drive lever 60 and the cantilevered valve handle 16. The quick connect clamp 72 is configured to be attachable and removable with just the use of a user's hands, meaning no special tools or devices are necessary to install or remove the quick connect clamp 72.

An advantage of this novel design is that the whole assembly for the retrofit motorized actuator assembly can be installed without having to cut, drill or in any way modify or tamper with the prior art fluid valve 10. Another advantage of this novel design is that the prior art fluid valve 10 can now be remotely opened or closed depending on various circumstances. For instance, the motorized actuator 48 is electrically operated and controlled. If a leak is detected through the use of an automatic sensing means installed in the building, a signal can be sent to the motorized actuator 48 and the flow of fluid through the fluid pipe 12 shut off. However, in some emergencies power or communication can be lost or the device controlling the motor malfunction. In these situations or emergencies, the quick connect clamp can be easily and quickly removed such that the valve handle 16 can be manually moved by the user without the aid of the motorized actuator 48.

Figure 8A:
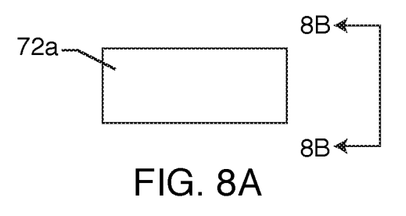
FIG. 8A is an exemplary embodiment of a quick connect clamp.
Figure 8B:
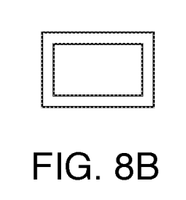
FIG. 8B is a side view of the structure of FIG. 8A taken along lines 8B-8B.

The quick connect clamp 72 can take many forms, designs or configurations known to those skilled in the art after reading this disclosure. FIGS. 8A and 8B show a simple embodiment of a sleeve 72*a*. The sleeve 72*a* is simple sleeve slipped over the drive lever 60 and valve handle 16 thereby locking them together.

Figure 9A:
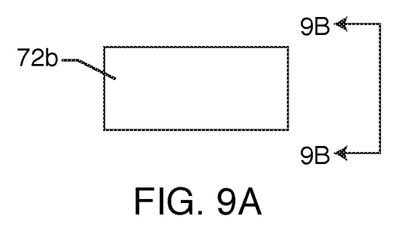
FIG. 9A is another exemplary embodiment of a quick connect clamp.
Figure 9B:
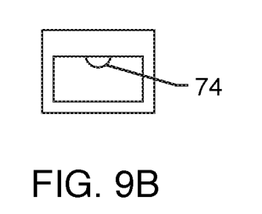
FIG. 9B is a side view of the structure of FIG. 9A taken along lines 9B-9B.

FIGS. 9A and 9B are a similar embodiment to FIGS. 8 but now includes a spring loaded detent or flexure detent 74 integrated into the quick connect clamp 72*b* that is configured to releasably engage apertures or recesses 76 disposed within the drive lever 60.

Figure 10A:
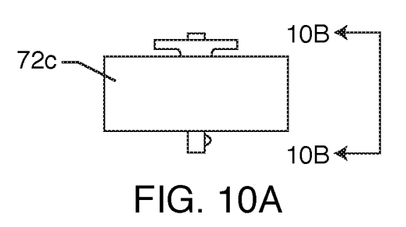
FIG. 10A is another exemplary embodiment of a quick connect clamp.
Figure 10B:
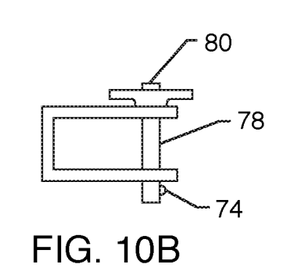
FIG. 10B is a side view of the structure of FIG. 10A taken along lines 10B-10B.

FIGS. 10A and 10B show a U-shaped quick connect clamp 72*c* that can be simply slid from one side and then locked on the opposite side with a pin 78. The pin 78 can also include a button 80 that releases a detent 74.

Figure 11A:
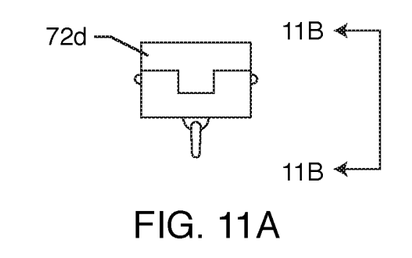
FIG. 11A is another exemplary embodiment of a quick connect clamp.
Figure 11B:
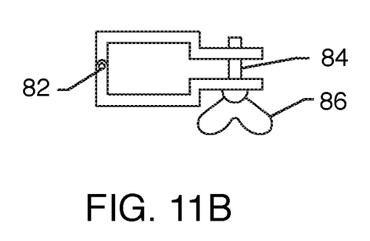
FIG. 11B is a side view of the structure of FIG. 11A taken along lines 11B-11B.

FIGS. 11A and 11 B show a hinged quick connect clamp 72*d* that pivots about a hinge 82 and then uses a fastener 84 to lock the two halves together. In this embodiment, the fastener 84 has a winged end 86 such that it can easily be rotated by the user to engage or disengage without the use of tools or other devices.

Figure 12A:
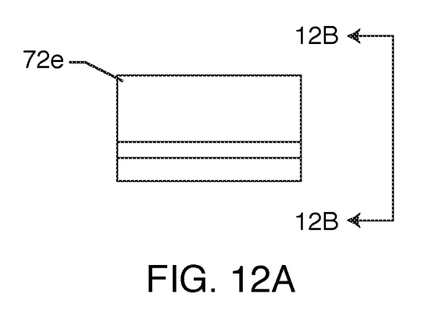
FIG. 12A is an exemplary embodiment of a quick connect clamp.
Figure 12B:
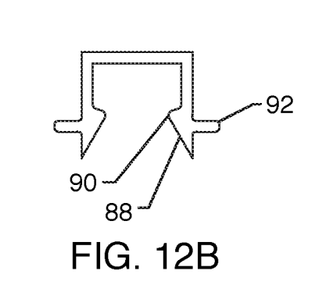
FIG. 12B is a side view of the structure of FIG. 12A taken along lines 12B-12B.

FIGS. 12A and 12B show a flexure-type quick connect clamp 72*e* that can be pushed over both the drive lever 60 and valve handle 16. The slanted opening 88 helps to aid in installation and the edge 90 helps to hold it onto the valve handle 16. Then the ribs 92 can be used to help flex the structure apart when trying to remove the flexure-type quick connect clamp 72*e*.

Figure 13:
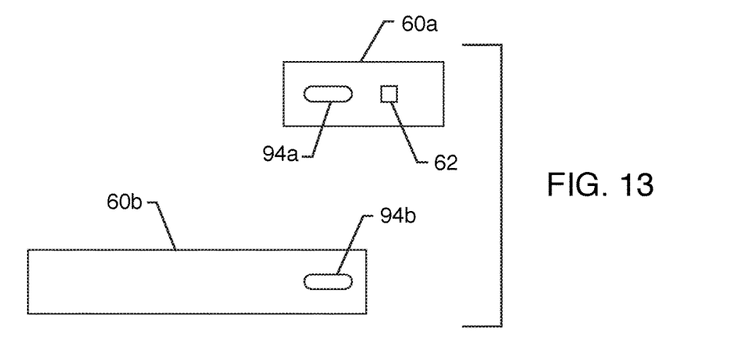
FIG. 13 is a top view on another exemplary embodiment of a drive lever that can be attached or separated through the use of a pin.
Figure 14A:
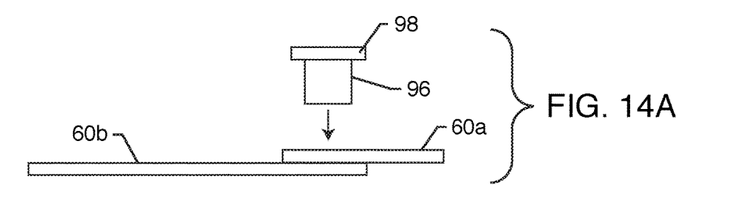
FIG. 14A is a side view of the structure of FIG. 13 shows the pin about to inserted into both slots of the two drive lever portions.
Figure 14B:
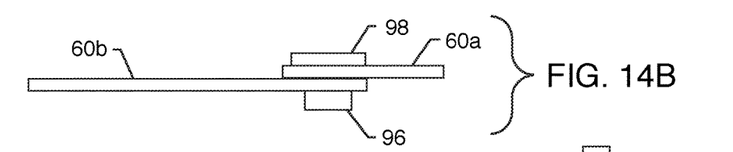
FIG. 14B is a side view similar to FIG. 14A now showing the removable pin connecting the two drive lever portions.

FIG. 13 shows a different embodiment of the quick connect clamp and drive lever where the two functionalities have been combined. The drive lever 60 has now been broken into two parts; drive lever 60*a* and drive lever 60*b*. A slot 94 is disposed through both ends of the drive levers, drive lever 60*a* having slot 94*a* and drive lever 60*b* having slot 94*b*. In use, the drive lever 60*a* is permanently installed onto the drive shaft extension 54. Similarly, the drive lever 60*b* is permanently installed onto the valve handle 16 through various clamps or known techniques. A slotted pin 96 is then inserted through both slots 94 as shown in FIGS. 14A and 14B. Due to the non-circular shape of the slotted pin 96, both drive levers 60a and 60b move as one. The slotted pin 96 doesn't fall through because the slotted pin head 98 is larger in width than the slot 94. When a user wants to disengage drive lever 60a from 60b, the user simply pushes the slotted pin 96 upward and pops it from the slots 94. In this way, the user can then manually grasp the valve handle 16 and either open or close the valve portion 14.

Figure 15:
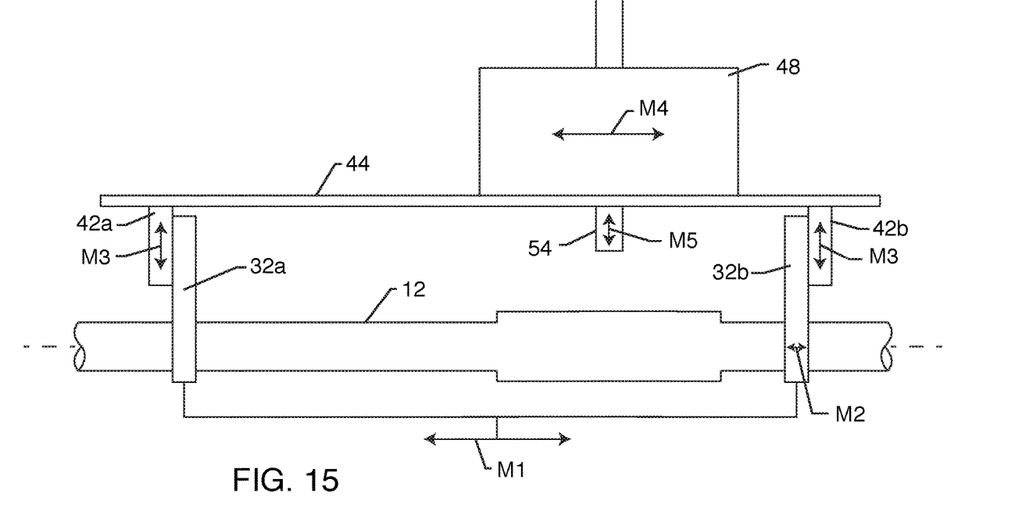
FIG. 15 is a simplified representation of the structure of FIG. 2 now showing the various motions M1-M5 of the various components of the retrofit motorized actuator assembly.

FIG. 15 is a simplified representation of FIG. 2 now showing the various motions of adjustability. Both the first pipe clamp 32a and pipe clamp 32b can move together in movement M1 where they can be positioned along the fluid pipe 12. Due the slots 46b on the mounting plate 44, the second pipe clamp 32b can also move in movement M2 to allow for various tolerance variances. The adjustable brackets 42a and 42b are able to be raised or lowered in movement M3 with respect to the pipe clamps 32. The motorized actuator 48 can also be moved in movement M4 due to the actuator mounting apertures 50 and drive slot 52 in the mounting plate 44. Finally, the drive shaft extension 54 can also be raised or lowered in movement M5 with respect to the motorized actuator 48. It will also be understood by those skilled in the art that some or all of the adjustability of the motions M1-M5 can be eliminated and the present invention still function appropriately. For example, the various clamps and brackets can be formed from one rigid structure that is configured to match a particular prior art fluid valve 10. Then, in a similar manner as discussed previously the quick connect clamp 72 would still be used to couple or decouple the drive lever 60 and valve handle 16.

Figure 16:
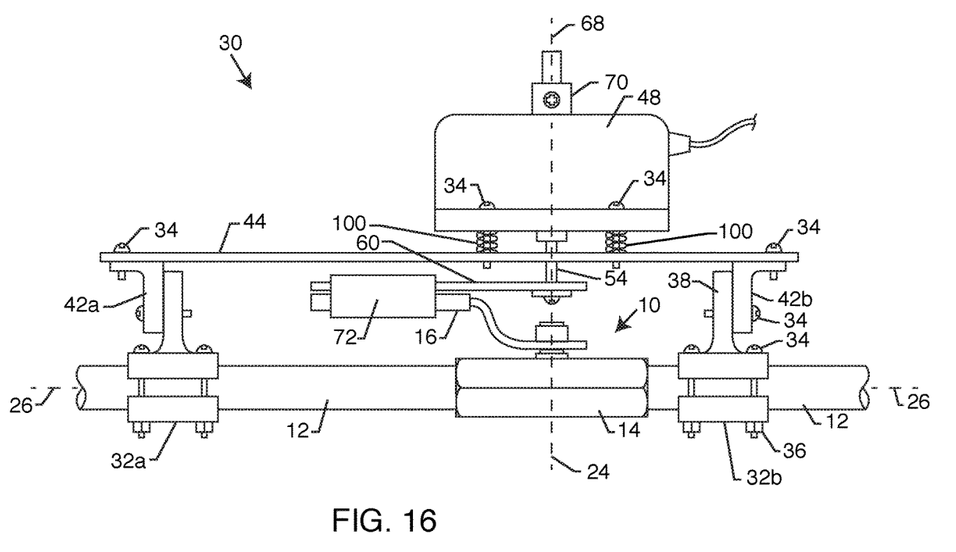
FIG. 16 is a view similar to FIG. 2 now showing the motorized actuator raised above the mounting plate through the use of springs.
Figure 17:
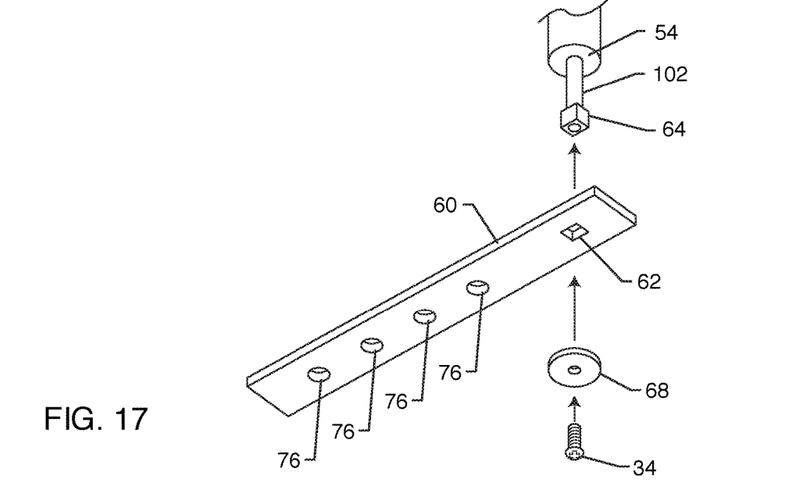
FIG. 17 is a view similar to FIG. 5 and shows the structure of FIG. 16 by now showing how the drive shaft extension can be disengaged from the drive lever when the motorized actuator is pressed downward by the user.

Another exemplary embodiment of the present invention is shown in FIGS. 16 and 17. A set of springs 100 are disposed between the motorized actuator 48 and the mounting plate 44. This forces the motorized actuator upward. At the same time the drive shaft extension 54 has been modified to have a middle portion 102 that is cylindrically shaped. The insertable key 64 is still located at the distal end of the drive shaft extension. In normal use the insertable key 64 is engaged into the key aperture 62 of the drive lever 60. If a user wants to disengage the drive shaft extension 54 from the driver lever 60, the user presses down on the motorized actuator 48 and this causes the insertable key 64 to pass through the key aperture 62 such that now the cylindrical portion 102 is disposed within the key aperture 62. Because the cylindrical portion is configured not to rotatably engage the drive lever, a user is able to rotate the valve handle 16 along with the drive lever 60.

It will be understood by those skilled in the art that many configurations of key shapes for the drive lever and drive shaft extension can be designed to engage and disengage such that this teaching is not limited to the specific design shown and taught herein, but is for illustrative purposes.

Furthermore, in this embodiment the compression springs are conveniently placed around the fasteners 34. However, the springs could be placed elsewhere and also take other forms. Therefore, the general concept is taught herein of creating a bias or force through springs, magnets, flexures or other force inducing structures to raise the motorized actuator such that a user can press downward to release the drive shaft extension and the drive lever. For example, the mounting plate 44 can be cut and bent such that it creates a flexible flexure that biases the motorized actuator in a higher position in normal use. Then when a user presses down on the motorized actuator the flexure flexes and disengages the drive shaft extension from the drive lever. It will be also understood that one skilled in the art could configure the motorized actuator to be raised to release the drive shaft extension from the drive lever rather being pushed downward.

Figures 18, 19:
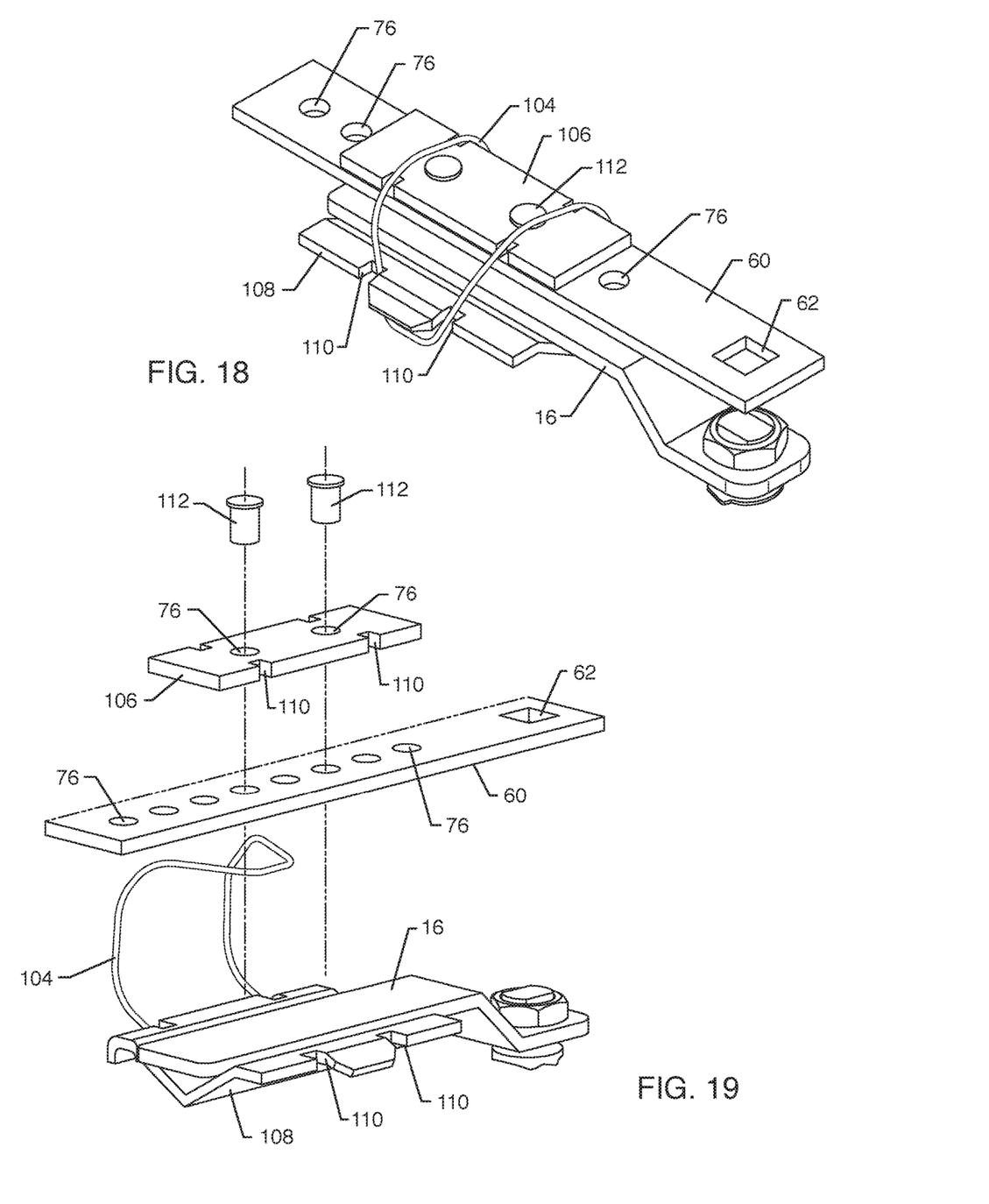
FIG. 18 is a perspective view of yet another embodiment of the present invention where now an elastic band is used to couple the drive shaft extension to the valve handle.
FIG. 19 is an exploded perspective view of the structure of FIG. 18.

FIG. 18 is a perspective view of yet another embodiment of the present invention where now an elastic band 104 is used to couple the drive shaft extension 54 to the valve handle 16. FIG. 19 is an exploded perspective view of the structure of FIG. 18. In these views, an upper bracket 106 is placed above the drive lever 60. The upper bracket 106 has notches 110 and apertures 76 that match the apertures 76 on the drive lever 60. A lower bracket 108 is placed below the valve handle 16. An elastic band 104 is captured by the notches 110 on the lower bracket 108 as the elastic band is wrapper above and over the upper bracket 106 and also captured by the notches 110 on the upper bracket 106. Pins 112 are placed through the apertures 76 on both the upper bracket 106 and the drive lever 60. The upper and lower brackets can then capture and connect the drive lever 60 and the valve handle 16 such that they move together. Then, in case of an emergency, all that is needed from the user is to unhook the elastic band 104 and the drive lever 60 and valve handle 16 can be separately moved.

Although several embodiments have been described in detail for purposes of illustration, various modifications may be made to each without departing from the scope and spirit of the invention. Accordingly, the invention is not to be limited, except as by the appended claims.

NUMERALS 10 prior art fluid valve
12 fluid pipe
14 valve portion
16 valve handle
18 extension, valve handle
20 stop, valve portion
22 bends, valve handle
24 axis of rotation, valve portion
26 longitudinal direction, fluid pipe
30 retro-fit motorized actuator assembly
32 first and second pipe clamp
34 fasteners
36 nuts
38 riser, pipe clamp
40 apertures, riser, pipe clamp
42 adjustable brackets
44 mounting plate
46 bracket mounting apertures, mounting plate
48 motorized actuator
50 actuator mounting apertures, mounting plate
52 drive slot
54 drive shaft extension
56 mounting plate top
58 mounting plate bottom
60 drive lever
62 key aperture, drive lever
64 inerstable key, drive shaft extension
66 washer
68 axis of rotation, drive shaft extension
70 collar
72 quick connect clamp
74 detent, quick connect clamp
76 aperture, drive lever
78 pin
80 button
82 hinge
84 fastener 86 winged end
88 slanted opening
90 edge
92 rib
94 slot, drive lever
96 slotted pin
98 slotted pin head
100 spring
102 cylindrical portion, drive shaft extension
104 elastic band
106 upper bracket
108 lower bracket
110 notches
112 pin

What is claimed is:

1. A retrofit motorized actuator assembly comprising a plurality of separate components attachable to a portion of a fluid pipe extending along a longitudinal direction having a manually actuated fluid valve connected in series along the portion of the fluid pipe, the fluid valve including a cantilevered valve handle manually rotatable about a valve axis that is perpendicular to the longitudinal direction for opening and closing the fluid valve, the retrofit motorized actuator assembly comprising:
a first and second pipe clamp each configured to fixedly attach to the portion of the fluid pipe on either side of the fluid valve;
a first and second adjustable bracket fixedly attachable to their respective first and second pipe clamps, each adjustable bracket translatably adjustable in relation to the pipe clamp in a direction perpendicular to the longitudinal direction;
a mounting plate including a first set of bracket mounting apertures disposed at one end of the mounting plate and a second set of bracket mounting apertures disposed at the other end of the mounting plate, the first and second set of bracket mounting apertures used to fixedly attach to their respective adjustable brackets with fasteners, the mounting plate also including a set of actuator mounting apertures;
a motorized actuator fixedly attachable to the mounting plate with additional fasteners through the use of the set of actuator mounting apertures, the motorized actuator including a drive shaft extension rotatably controllable by the motorized actuator, the drive shaft extension extendable through the mounting plate;
a drive lever connectable to the drive shaft extension, the drive lever configured to be adjacently disposed in parallel to the cantilevered valve handle;
a quick connect clamp configured to fixedly attach together both the drive lever and the cantilevered valve handle, wherein the quick connect clamp is attachable and removable with just the use of a user's hands;
wherein the set of actuator mounting apertures provide at least two positions for the motorized actuator to be fixedly attached to the mounting plate, the at least two positions being disposed along the longitudinal direction.

2. The retrofit motorized actuator assembly of claim 1, wherein the quick connect clamp is configured to be attachable and removable without the use of external tools or devices.

3. The retrofit motorized actuator assembly of claim 1, wherein the quick connect clamp is a separate part from the drive lever.

4. The retrofit motorized actuator assembly of claim 1, wherein the quick connect clamp is part of the drive lever.

5. The retrofit motorized actuator assembly of claim 1, wherein the quick connect clamp is a ring configured to slide over and couple together the drive lever and the cantilevered valve handle.

6. The retrofit motorized actuator assembly of claim 1, wherein the quick connect clamp is a U-shaped structure with a hand-releasable locking fastener.

7. The retrofit motorized actuator assembly of claim 1, wherein the quick connect clamp is a two-part assembly held together with at least one hand-releasable locking fastener.

8. The retrofit motorized actuator assembly of claim 1, wherein the first and second pipe clamp each comprise two parts held together with at least one fastener.

9. The retrofit motorized actuator assembly of claim 1, wherein the set of actuator mounting apertures includes a centered slot elongated along the longitudinal direction.

10. The retrofit motorized actuator assembly of claim 1, wherein the set of actuator mounting apertures includes a plurality of thru holes disposed along the longitudinal direction.

11. The retrofit motorized actuator assembly of claim 1, wherein the drive lever includes a drive shaft key aperture configured to match the shape of the drive shaft extension.

12. The retrofit motorized actuator assembly of claim 1, wherein the motorized actuator includes at least one set of wires connectable to controlling electronics and/or devices.

13. The retrofit motorized actuator assembly of claim 1, wherein the motorized actuator includes a wireless communication system connectable to controlling electronics and/or devices.

14. The retrofit motorized actuator assembly of claim 1, wherein the set of actuator mounting apertures provide a plurality of positions for the motorized actuator to be fixedly attached to the mounting plate, the plurality of positions being disposed along the longitudinal direction.

15. A retrofit motorized actuator assembly comprising a plurality of separate components attachable to a portion of a fluid pipe extending along a longitudinal direction having a manually actuated fluid valve connected in series along the portion of the fluid pipe, the fluid valve including a cantilevered valve handle manually rotatable about a valve axis that is perpendicular to the longitudinal direction for opening and closing the fluid valve, the retrofit motorized actuator assembly comprising:
a motorized actuator including a drive shaft extension rotatably controllable by the motorized actuator about a drive shaft axis;
a mounting assembly configured to fixedly attach to the portion of the fluid pipe and also fixedly position the motorized actuator wherein the drive shaft axis of the motorized actuator is aligned with the valve axis;
a drive lever connectable or connected to the drive shaft extension, the drive lever configured to be adjacently disposed in parallel to the cantilevered valve handle;
a quick connect clamp configured to fixedly attach together both the drive lever and the cantilevered valve handle, wherein the quick connect clamp is attachable and removable with just the use of a user's hands, wherein the quick connect clamp is a ring configured to slide over and couple together the drive lever and the cantilevered valve handle, wherein the ring of the quick connect clamp is a single ring or a rigid ring.

16. A retrofit motorized actuator assembly comprising a plurality of separate components attachable to a portion of a fluid pipe extending along a longitudinal direction having a manually actuated fluid valve connected in series along the portion of the fluid pipe, the fluid valve including a cantilevered valve handle manually rotatable about a valve axis that is perpendicular to the longitudinal direction for opening and closing the fluid valve, the retrofit motorized actuator assembly comprising:

a motorized actuator including a drive shaft extension rotatably controllable by the motorized actuator about a drive shaft axis;

a mounting assembly configured to fixedly attach to the portion of the fluid pipe and also fixedly position the motorized actuator wherein the drive shaft axis of the motorized actuator is aligned with the valve axis;

a quick connect clamp configured to fixedly attach together both the drive shaft extension and the cantilevered valve handle, wherein the quick connect clamp is attachable and removable with just the use of a user's hands, wherein the quick connect clamp is a ring configured to slide over and couple together the drive lever and the cantilevered valve handle, wherein the ring of the quick connect clamp is a single ring or a rigid ring.

17. A retrofit motorized actuator assembly comprising a plurality of separate components attachable to a portion of a fluid pipe extending along a longitudinal direction having a manually actuated fluid valve connected in series along the portion of the fluid pipe, the fluid valve including a cantilevered valve handle manually rotatable about a valve axis that is perpendicular to the longitudinal direction for opening and closing the fluid valve, the retrofit motorized actuator assembly comprising:

a first and second pipe clamp each configured to fixedly attach to the portion of the fluid pipe on either side of the fluid valve;

a first and second adjustable bracket fixedly attachable to their respective first and second pipe clamps, each adjustable bracket translatably adjustable in relation to the pipe clamp in a direction perpendicular to the longitudinal direction;

a mounting plate including a first set of bracket mounting apertures disposed at one end of the mounting plate and a second set of bracket mounting apertures disposed at the other end of the mounting plate, the first and second set of bracket mounting apertures used to fixedly attach to their respective adjustable brackets with fasteners, the mounting plate also including a set of actuator mounting apertures, wherein the set of actuator mounting apertures includes a centered slot elongated along the longitudinal direction;

a motorized actuator fixedly attachable to the mounting plate with additional fasteners through the use of the set of actuator mounting apertures, the motorized actuator including a drive shaft extension rotatably controllable by the motorized actuator, the drive shaft extension extendable through the mounting plate;

a drive lever connectable to the drive shaft extension, the drive lever configured to be adjacently disposed in parallel to the cantilevered valve handle;

a quick connect clamp configured to fixedly attach together both the drive lever and the cantilevered valve handle, wherein the quick connect clamp is attachable and removable with just the use of a user's hands.

\* \* \* \* \*